United States Patent Office 2,885,440
Patented May 5, 1959

2,885,440

PROCESS OF PREPARING CYCLOALKANONE-OXIMES

Martin Rieber, Schonberg (Taunus), and Ludwig Orthner, Frankfurt am Main, Germany, assignors to Farbwerke Hoechst Aktiengesellschaft vormals Meister Lucius & Bruning, Frankfurt am Main Hochst, Germany, a corporation of Germany No Drawing. Application September 29, 1953
Serial No. 383,143

Claims priority, application Germany October 23, 1952

5 Claims. (Cl. 260—566)

The present invention relates to a process of preparing cycloalkanone-oximes.

Various processes are already known for reducing secondary cycloaliphatic nitro-hydrocarbons, for example with stannous chloride or with hydroxyl-amine, or with hydrogen and a catalyst, so as to obtain cycloalkanone-oximes.

We have found that salts of dithionous acid ($Na_2S_2O_4$) or of hydroxymethane sulfinic acid $$(NaHSO_2 \cdot CH_2O \cdot 2H_2O)$$

can be used for the manufacture of oximes from the water-soluble salts of secondary nitro-compounds of the cycloaliphatic series, i.e., a cycloaliphatic compound having a nitro-substituent on a secondary carbon atom which is a carbon atom attached to two other carbon atoms. It has furthermore been observed that reaction occurs in neutral to acid solution, but does not occur in an alkaline solution. Since, on adding an acid to an aqueous solution of a salt of a nitro-cycloalkane in the presence of a salt of dithionous acid or of hydroxymethane sulfinic acid, the reaction may take place in different directions, exactly defined reaction conditions have to be observed. In this case it is of importance, in addition to effecting the rapid introduction of the acid, to keep the temperature below 20° C. if a salt of dithionous acid is used; preferably, the operation is conducted at −5° C. to +5° C. If a salt of hydroxy-methane sulfinic acid is used, the temperature may be raised to about 80° C., but it is advantageous to operate at a temperature between +10° C. and 30° C.

The rapid addition of acid must take place for the following reasons: The acid causes the liberation of the thio acid in question from the salt of the particular reducing component. The rapid addition of the acid is carried out in order to cause the free thio acid to exert its reducing action immediately after its formation, spontaneous decomposition with formation of elementary sulfur being thus avoided. In view of these statements those skilled in the art can easily determine the period, in each individual case, during which the acidification must take place.

The reduction takes place only after rapid addition of such a quantity of acid to the aqueous alkaline mixture of solutions of the secondary nitro-cycloalkane salt and the salt of dithionous acid or of hydroxy-methane sulfinic acid that the solution shows a neutral to feebly acid reaction. This occurs as soon as the alkali of the alkaline nitro-cycloalkane solution has been neutralized and the pH-value has been adjusted to between about 2 and about 7.

The ratio of the quantity of dithionous acid or hydroxymethane sulfinic acid to nitro-cycloalkane amounts to about ½ to 1 mol of reducing compound to 1 mol of the nitro compound.

The reaction occurs very rapidly and is complete when stirring has been continued for 30 to 60 minutes. In working up, it should be noted, in order to avoid loss, that the cycloalkanone-oximes have a better solubility in the presence of the sulfur compounds than in pure water.

The process can be considerably improved by adding, before or after the introduction of the acid, a small quantity of hydroxylamine or of a salt thereof or of a compound yielding hydroxylamine. For example, a mixture of sodium nitrite and sodium bisulfite in aqueous solution may also be used, which according to the so-called Raschig process, yields hydroxylamine sulfonates which themselves give rise to hydroxylamines ⅒ to ¼ mol of hydroxylamine is sufficient for 1 mol of the nitro-cycloalkane used.

As starting materials may be used all the cycloaliphatic secondary nitro-compounds, such as nitrocyclopentane, nitrocyclohexane or the like. All the water-soluble salts of dithionous acid and of hydroxy-methane sulfinic acid, such as the alkali metal and ammonium salts, are suitable as reducing components. Among the alkali metal salts the sodium and potassium salts are particularly suitable. As cations of the nitro-cycloalkane salts the radicals named may also be used. Finally, it is also possible to use instead of the water-soluble salts of the reaction components the water-insoluble salts in the form of their aqueous suspensions.

The oximes obtained by the present process are, in general, useful without any further treatment for the great variety of applications of the oximes.

The yields attained by the present process amount to about 85 percent.

As acids which may be used for the acidification of the reaction mixture may be named the strong inorganic acids especially hydrochloric and sulfuric acids.

It may also be possible to mix at a low temperature the dithionous acid or hydroxymethane sulfinic acid salt and the acid to be aadded to the reaction mixture; the salt solution of nitro-cycloaliphatic hydrocarbon is then caused to run in. In other words, care has to be taken that the sulfur containing acid set free does not undergo a decomposition with separation of sulfur, before it can exert its reducing action.

The following examples serve to illustrate the invention but they are not intended to limit it thereto, the parts being by weight unless otherwise stated and the relation between part by weight and part by volume being the same as that between the kilogram and the liter:

*Example 1*

A solution of 130 parts of nitro-cyclohexane in 605 parts by volume of 2:5N-sodium hydroxide solution is added at 0° C. to a solution of 250 parts of sodium dithionite in 1000 parts by volume of water. After stirring for a short time (10 to 30 minutes) 720 parts by volume of 2N-hydrochloric acid, cooled to −10° C., are rapidly added. The mixture is stirred for 1 hour. After the hydrogen ion concentration has been adjusted to a pH-value of 6–7, the oxime which has precipitated is filtered with suction, the filtrate is extracted with ether and the ether is evaporated. The yield amounts to 70 parts (=65 percent) of cyclohexanone-oxime.

*Example 2*

A solution of 130 parts of nitro-cyclohexane in 605 parts by volume of 2:5N-sodium hydroxide solution is added at 0° C. to a solution of 250 parts of sodium dithionite in 1000 parts by volume of water. After stirring for a short time (10 to 30 minutes) 720 cc. of 2N-hydrochloric acid cooled to −10° C. are rapidly added. 2–5 minutes after the introduction of the acid, a saturated aqueous solution of 2 parts of hydroxylamine hydrochloride is added and the mixture is stirred for 1 hour.

The mixture is then neutralized to a hydrogen ion concentration corresponding to a pH value of 6–7, filtered with suction and the filtrate is extracted with ether. The ether is evaporated and finally the product is distilled under reduced pressure. The yield amounts to 90 parts of cyclohexanone-oxime (=83 percent).

*Example 3*

A saturated aqueous solution of 200 parts of sodium hydroxymethane sulfinate is introduced at room temperature into a solution of 130 parts of nitro-cyclohexane in 605 parts by volume of 2:5N-sodium hydroxide solution. The mixture is stirred for 1 hour, 650 parts by volume of 2N-hydrochloric acid are then rapidly added and stirring is continued for 1 hour. After an adjustment to a hydrogen ion concentration corresponding to a pH-value of 6–7, the mixture is filtered with suction, the filtrate is extrated with ether, the ether is evaporated and finally the product is distilled under reduced pressure. The yield amounts to 70 parts of cyclohexanone-oxime (=65 percent).

We claim:

1. A process for the preparation of cyclohexanone-oxime which comprises reducing an alkali metal salt of nitrocyclohexane with about an equivalent amount of an alkali-metal dithionite in an aqueous medium in the presence of excess mineral acid.

2. A process of preparing oximes of cyclic ketones by the reduction of mononuclear mononitro-cycloalkanes wherein the nitro group is attached to a carbon atom bound to two other carbon atoms, which comprises reducing an alkali-metal salt of a mononuclear mononitro-cycloalkane wherein the nitro group is attached to a carbon atom bound to two other carbon atoms, with an alkali-metal salt of dithionous acid in an aqueous medium in the presence of excess mineral acid at a temperature not exceeding 20° C.

3. A process of preparing oximes of cyclic ketones by the reduction of mononuclear mononitro-cycloalkanes wherein the nitro group is attached to a carbon atom bound to two other carbon atoms, which comprises reducing an alkali-metal salt of a mononuclear mononitro-cycloalkane wherein the nitro group is attached to a carbon atom bound to two other carbon atoms, with an alkali-metal salt of dithionous acid in an aqueous medium in the presence of excess mineral acid at a temperature not exceeding 20° C., about 0.5 to 1.2 mol of alkali-metal salt of dithionous acid being used for every mol of the alkali-metal salt of the nitro-cycloalkane.

4. A process of preparing oximes of cyclic ketones by the reduction of mononuclear mononitro-cycloalkanes wherein the nitro group is attached to a carbon atom bound to two other carbon atoms, which comprises reducing at a temperature not exceeding 20° C. an alkali-metal salt of a mononuclear mononitro-cycloalkane wherein the nitro group is attached to a carbon atom bound to two other carbon atoms, with an alkali-metal salt of dithionous acid in an aqueous medium by rapidly adding a mineral acid to an aqueous solution of said alkali-metal salts in quantity sufficient to produce a neutral to feebly acid solution, the amount of alkali-metal salt of dithionous acid being about 0.5 to 1.2 mol for every mol of the alkali-metal salt of the nitrocycloalkane.

5. A process for the preparation of cyclohexanone-oxime which comprises reducing an alkali-metal salt of nitro-cyclohexane with an alkali-metal dithionite in an aqueous medium in the presence of excess mineral acid, the amount of alkali-metal salt of dithionous acid at a temperature not exceeding 80° C. being about 0.5 to 1.2 mol for every mol of the alkali-metal salt of nitrocyclohexane.

References Cited in the file of this patent

UNITED STATES PATENTS

| | | |
|---|---|---|
| 2,800,508 | Rieber at al. | July 23, 1957 |

FOREIGN PATENTS

| | | |
|---|---|---|
| 171,709 | Austria | June 25, 1952 |
| 499,518 | Belgium | Dec. 15, 1950 |
| 502,123 | Belgium | Apr. 14, 1951 |
| 837,691 | Germany | May 2, 1952 |
| 855,254 | Germany | Nov. 10, 1952 |